J. T. SHEARD.
MANUFACTURE OF SULFATE OF AMMONIA.
APPLICATION FILED MAY 19, 1919.

1,313,023.
Patented Aug. 12, 1919.

INVENTOR
*J. T. Sheard,*
By *H. R. Korslake*
ATTORNEY

UNITED STATES PATENT OFFICE.

JOHN TOMLINSON SHEARD, OF BIRLEY CARR, NEAR SHEFFIELD, ENGLAND.

MANUFACTURE OF SULFATE OF AMMONIA.

1,313,023.           Specification of Letters Patent.        Patented Aug. 12, 1919.

Application filed May 19, 1919. Serial No. 298,207.

*To all whom it may concern:*

Be it known that I, JOHN TOMLINSON SHEARD, a subject of the King of Great Britain and Ireland, and residing at 6 Salisbury road, Birley Carr, near Sheffield, in the county of York, England, have invented certain new and useful Improvements in the Manufacture of Sulfate of Ammonia, of which the following is a specification.

Sulfate of ammonia as produced in the usual manner, namely, by passing volatilized ammonia into sulfuric acid in a vat or saturator, as it is called, until crystals of the salt are formed, always contains more or less free sulfuric acid. This is not surprising when it is considered that the crystals are deposited in a solution of sulfate of ammonia and sulfuric acid. For the operation cannot be allowed to go on until the whole of the acid is neutralized, and this for two reasons: first, because there would be a danger, amounting almost to a certainty, of losing ammonia; and secondly, because of the likelihood of forming ferrocyanid in the sulfate and so impairing its value as a fertilizer and for other purposes. When the deposited crystals of sulfate of ammonia are removed from the saturator, either by hand "fishing" with scoops or by steam ejector or other means, they are necessarily enveloped in the mother liquor, containing free acid, in which they have been formed, and although the latter is allowed to drain away from the sulfate as completely as possible it always leaves the sulfate contaminated with a little free acid. The amount of such free acid is stated, in a circular issued by the Sulphate of Ammonia Association, to vary from about .30 per cent. in the best makes to 1.00 per cent. in the worst. It is objectionable because it destroys the bags in which the sulfate is packed, and also because it absorbs moisture from the atmosphere and so hinders the complete drying of the sulfate.

Now I have found that by spraying clean water over the magma of crystals of sulfate in their enveloping mother liquor, just as removed or ejected from the saturator, the salt contains, when drained, very much less free acid than when such spraying is not carried out. This result is due, I believe, to the fact that the free sulfuric acid in the mother liquor which envelops the crystals of sulfate has a greater avidity for water than the crystals themselves have, and by becoming diluted is enabled more freely to flow away from the crystals of sulfate when these latter are left to drain. An incidental benefit results from this treatment in that the appearance of the sulfate is vastly improved, a much whiter salt being obtained.

It has heretofore been proposed to wash the crystals of sulfate of ammonia after they have drained for the purpose of improving the quality of the sulfate and freeing them from acid. According to one proposition a special construction of plant has been suggested in which the sulfate is washed during its withdrawal from the saturator by means of an endless conveyer chain carried in a tube centrally disposed within the aforesaid saturator and carrying perforated or open mesh buckets. The sulfate is lifted from the base of the saturator in these buckets so that it gradually drains in its upward travel, means such as a perforated ring or manifold being provided at the top of the conveyer for supplying a counter-current of water. The sulfate and water move or flow in opposite directions through a common path of substantial length with the scrubbing action proceeding from end to end thereof, the sulfate encountering progressively clearer or fresher water as it moves toward the discharge end of the conveyer for the purpose of effecting a most thorough washing or rinsing action.

The object of this proposal is to enable the sulfate to be discharged from the saturator effectively washed and in a non-acid state.

The object of my invention is to provide a simple means for dealing with sulfate discharged from a saturator in an acid state and at the same time, as far as possible, to avoid washing the sulfate.

As has been indicated above, therefore, my invention consists in spraying clean water over the magma of crystals of sulfate in their enveloping acid liquor just as removed or ejected from the saturator, the spraying being effected immediately such removal takes place and before draining, for the purpose of diluting the mother liquor and so enabling it readily to drain away from the crystals on an ordinary draining table without having recourse to washing the crystals and thereby losing sulfate.

In carrying out my invention, therefore, I arrange that the magma of crystals of sulfate in their enveloping mother liquor, as it flows or is ejected from the saturator, is played upon by a shower of intimately divided or atomized jets of water. In its simplest form the arrangement consists of a tube conveying water under pressure, having a flexible or swiveled end-piece terminating in a rose or other form of jet which will deliver the water in a shower of fine spray, and which is directed as already explained on the magma of crystals of sulfate enveloped in mother liquor issuing from the saturator. In the construction of such apparatus I do not limit myself to the precise details above described, as it is obvious that considerable variation may be made in the same without impairing the result so long as the essential feature of the invention is adhered to, which is to spray the magma of crystals of sulfate enveloped in mother liquor directly it issues from the saturator.

There is no loss by this process, as whatever is dissolved out of the sulfate by the washing drains away with the mother liquor to the well or other receptacle for further use.

Three simple forms of ordinary apparatus are shown in the diagrams Figures 1 to 3 for purposes of explanation.

Figure 3:
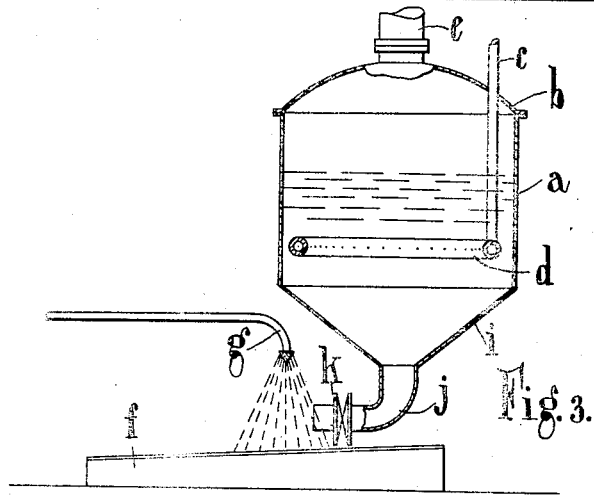

Fig. 3 a closed saturator with bottom discharge.

Figure 1:
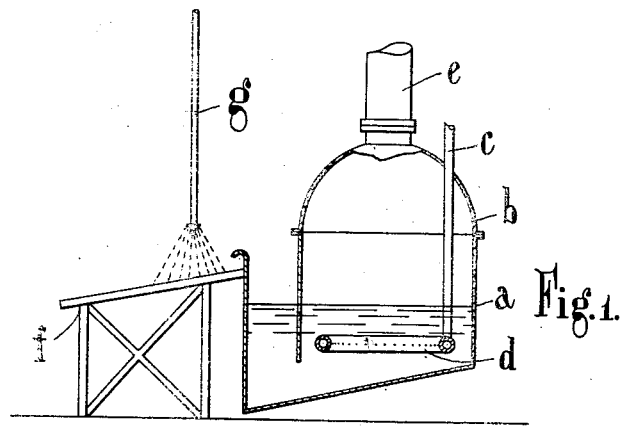
Fig. 1 shows an open saturator arranged for hand fishing of the crystals.

In ordinary practice these are the three methods of discharging sulfate from a saturator. In the form shown in Fig. 1 the open saturator tank $a$ is combined with the bell $b$ into which ammonia is passed by means of the pipe $c$ and discharging ring $d$, waste gases leaving by the exit $e$. Affixed to the side of the saturator is an ordinary draining table $f$ above which I apply a water jet $g$. The crystals of sulfate are removed by hand fishing with a scoop, that is, a bowl at the end of a long rod, which is dipped into the saturator and brings up a mass of crystals with enveloping mother liquor, which is deposited on the draining table $f$. In this case the water spray is played over the mass as it is being deposited on the draining table.

Figure 2:
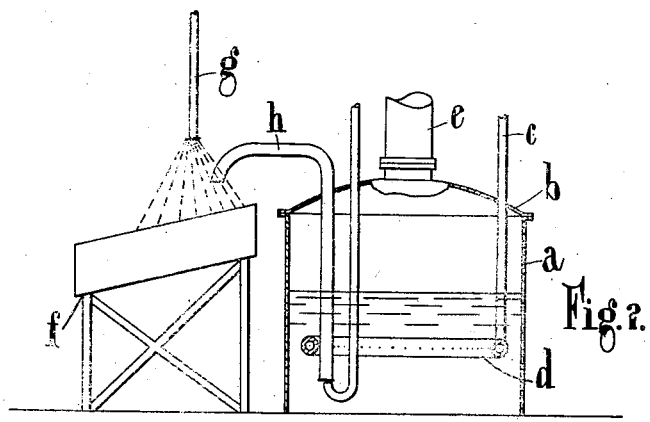
Fig. 2 shows a closed saturator with steam ejector.

In the form shown in Fig. 2 a steam ejector $h$ is arranged to eject the sulfate from the lowest part of the interior of the saturator. When steam is turned on, a stream of mixed crystals and mother liquor is discharged from the ejector on to the draining table. In this case the jet delivering the water spray is fixed near to and immediately above the outlet of the ejector, so that the stream of mixed crystals and mother liquor, while flowing from the saturator, is enveloped in water spray or mist.

In the form shown in Fig. 3, the lower part of the saturator is made in the form of an inverted cone $i$ with a bent piece $j$ and valve $k$ fixed at the apex. As the crystals of sulfate form and accumulate in the saturator the valve is periodically opened and a mass of crystals and mother liquor flows out and on to the draining table, meeting and being enveloped by the finely divided water spray coming from the jet $g$ fixed immediately over the discharge orifice.

Thus in all cases I envelop the mass of crystals and accompanying mother liquor in water spray, immediately they are removed from the saturator and before any mother liquor has drained away, because the object is not to wash the crystals but to dilute the accompanying mother liquor, so that the latter can more easily and more completely drain or flow away from the crystals.

In other words, I dilute the mother liquor which surrounds every crystal, and which has considerable affinity for water, and then allow such diluted mother liquor to drain away from the crystals. The water spray is only in operation as the mixed sulfate and mother liquor is being delivered from the saturator. When the supply of sulfate ceases to flow, the water is stopped, that is, I do not continue the spray on the salt from which the mother liquor has drained away. In other words, I only spray with water the mother liquor which accompanies the crystals as delivered from the saturator.

I claim:

In the manufacture of sulfate of ammonia, a process for reducing the amount of free acid which will be contained in the sulfate when drained, consisting in spraying with clean water the magma of crystals of sulfate enveloped in mother liquor immediately it is ejected from the saturator, and before any draining away of mother liquor from said crystals has been allowed to take place.

In testimony whereof I have signed my name to this specification.

JOHN TOMLINSON SHEARD.